Aug. 22, 1967

J. BOUGLÉ

3,337,685

MULTIPLEX OPTICAL SYSTEM WITH SELECTIVE IMAGE POSITION CONTROL

Filed July 21, 1964

2 Sheets-Sheet 1

United States Patent Office 3,337,685

Patented Aug. 22, 1967

3,337,685

MULTIPLEX OPTICAL SYSTEM WITH SELECTIVE IMAGE POSITION CONTROL

Jean Bouglé, Paris, France, assignor to Compagnie Generale de Radiologie, Paris, France, a French body corporate Filed July 21, 1964, Ser. No. 384,214
Claims priority, application France, July 23, 1963, 942,325
11 Claims. (Cl. 178—7.88)

ABSTRACT OF THE DISCLOSURE

To successively record on different supporting media (TV screen, still and motion picture cameras) X-ray images formed on the screen of a brightness intensifier, the images are simultaneously displayed by television means for monitoring and checking purpose; a rotatable and translating semi-transparent mirror is positioned relatively to each of a plurality of objective lines for the recording media.

This invention relates to optical apparatus of the type in which an image provided by the apparatus may have to be formed in more than one position depending on the circumstances in which the apparatus is being utilized. For example, it may be desired to receive the image in one positon on a television camera for remote display, in another position on a cine-camera for cinematographic recording, and in a third position on a photo-camera for fixed-view photography.

The invention is more especially though not exclusively directed to X-ray systems provided with brightness amplifier tubes which produce small but extremely bright images capable of being viewed or utilized in a variety of ways, including projection on a screen for direct viewing, pick-up by a television camera for remote viewing on a television screen, pick-up by a photo-camera and/or by a cine-camera.

The development in recent years of electronic appliances including television and the brightness- or luminance-amplifier has greatly extended the range of use and versatility of optical instruments of all kinds as used in research, medicine, teaching and industry. However, the very multiplicity of different means now made available for exploiting one and the same image as produced by an X-ray, microscope or other type of optical instrument, has introduced practical problems. The usual method for simultaneously projecting an optical image-carrying beam on to two different receiving units, such as a television camera and a cine-camera, is to interpose a semi-reflector member, such as a semi-transparent plane mirror, in the path of the beam and inclined 45° to the beam axis, and to arrange a first one of the receiver units, e.g., the TV-camera, coaxially with the beam beyond the semi-reflector so as to receive the direct transmitted beam therethrough, and arrange the second receiver, e.g., cine-camera at right angles to the beam in order to receive the reflected beam component. Retraction of the semi-reflector from out of the path of the beam will allow the first receiver unit (TV-camera) to be utilized alone, so as to be energized with the full light flux from the beam, in cases where the second receiver unit is unnecessary.

When however it is desired, as is now frequency the case, to use a third receiver unit, say a photo-camera, alternatively to the second reeciver unit, the arrangement of the means serving to switch the beam image selectively between the various receiver units becomes considerably more complicated. In one type of system currently used, the three receiver units are arranged in mutually orthogonal relation, and there is provided a pair of semi-reflectors, e.g., mirrors mounted in a common revolver barrel selectively rotatable about the beam axis to respective angular positions in which one or the other of the semi-reflectors in it is positioned to direct the reflected beam component on to a related one of the receivers. Such an arrangement is complicated and cumbersome owing to the use of two separate semi-reflectors and the revolving barrel for mounting them. The relatively large radial and axial dimensions of this barrel or equivalent supporting structure, as well as the requirement for provision to retract both semi-reflectors out of the path of the beam, not only complicates the system but introduces optical defects into the resulting images, especially for the following reason.

In any optical system in which a light beam is to be transmitted from one objective lens unit to another there is a falling-off of brightness from the centre towards the margins of the illuminated field, well-known in optics as the vignetting effect. This effect increases with the axial distance between the lens units, and it is therefore a desideratum that all optical axial distances between successive lens units of the system which the beam is transmitted shall be held to a minimum. In the conventional arrangement referred to in the immediately preceding paragraph, the relatively large dimensions of the interposed semi-reflector assembly entails the need for correspondingly large optical distances between some or all of the lens units associated with the brightness amplifier tube and the respective image receivers, and thereby correspondingly increases the objectionable vignetting effect in the resulting images.

Objects of this invention include the provision of optical apparatus of the type in which a common image is to be selectively formed in more than one position for exploitation by more than one receiver means, which will possess part or all of the following advantageous features over conventional apparatus of that type:

Increased simplicity, lightness and compactness of the optics and mechanics to effect selective control of the image between its positions;

Reduction in the over-all dimensions of the apparatus;

Reduction in the optical distances between successive lens units in the apparatus thereby reducing vignetting effects and enhancing the optical quality of the resulting images;

Use of a single semi-reflector, such as a single transparent plane mirror, for selectively directing an image from a single beam to a first receiver, or both to said first and a second receiver, or both to said first and a third receiver;

Improved mechanism for selectively, accurately positioning an optical reflector member to either of two active positions in 90° angular relation to each other, and to a third, retracted position.

As specific object is to provide an improved X-ray apparatus embodying a brightness amplifier tube and means for selectively receiving the image formed by said tube in more than one position for exploitation by respective receiver units such as a television camera, a photo-camera and a cine-camera.

The above and further objects of the invention and the characteristic features thereof will stand out from the ensuing disclosure of an exemplary embodiment selected by way of illustration but not limitation and from the accompanying drawings wherein.

Figure 1:
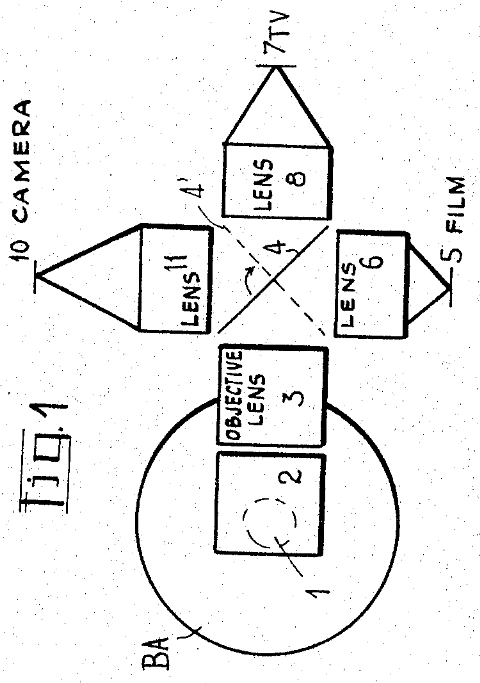
FIG. 1 is a simplified view of the improved apparatus in plan.
Figure 2:
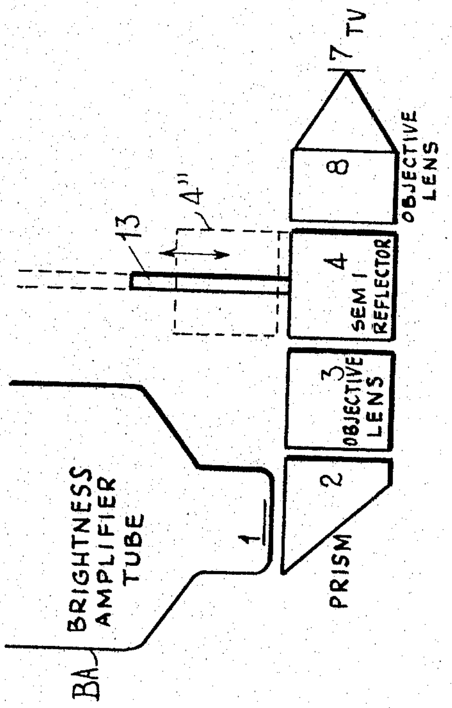
FIG. 2 is a corresponding view in elevation.

Referring to FIGS. 1 and 2, the components of the apparatus are shown in schematic outline. The apparatus includes a brightness amplifier tube of conventional form, generally designated BA, and provided in its reduced lower end section with an image-forming screen 1 on which a small and extremely bright image is adapted to be formed in operation. It will be understood that in an aspecially valuable application of the invention the brightness amplifier tube BA forms the end or output unit of a conventional X-ray system not shown and the image on screen 1 would then be an X-ray image. However this particular use is in no way restrictive and the screen 1 may constitute the output unit of various other optical instrument systems, e.g., microscope system.

Positioned opposite to the output screen 1 of the brightness amplifier is a reflector prism 2 having a lower side face inclined at 45° as shown so as to reflect the image-carrying beam on the screen 1 in a horizontal rightward direction according to FIGS. 1 and 2. The resulting beam is passed through a first objective lens or collimator unit 3 which renders the beam parallel, i.e., forms an image of screen 1 at infinity.

The parallel image-carrying beam issuing from lens unit 3 is adapted to be focused selectively on an input element of each of three different receiver units, said elements being indicated at 7, 5 and 10, respectively, so as to form an image of brightness-amplifier screen 1 on each of said input elements. For example, the input element 7 may constitute the target of a television camera tube; the input element 5 may constitute the sensitive film of a cine-camera; and the input element 10 may similarly constitute the film of a photo-camera. It will be understood that the actual receiver units, such as a TV-camera, cine-camera and photo-camera, of which the input elements 7, 5 and 10 form part, have not been shown for simplicity. As indicated, element 7 is positioned coaxially with the optical axis of the parallel beam issuing from lens unit 3, while elements 5 and 10 are positioned on a common axis perpendicular to and intersecting the common axis of said beam and element 7 and on opposite sides of the beam.

Coaxially with each of the elements 5, 7 and 10, there is associated a related objective lens unit, respectively 6, 8 and 11, which is adapted to focus on to the associated element 5, 7 or 10, the image carried by a parallel beam impinging on the input side of the lens unit. Thus with the arrangement as so far described, it will be understood that the lens unit 8 focuses the parallel beam issuing from lens unit 3 so as to form an image of the brightness-amplifier screen 1 upon the input element 7 of the television camera (or other receiver unit) associated with that element.

In accordance with this invention a single semi-reflector member 4, such as a semi-transparent plane mirror, is movably mounted between the lens units 3, 6, 8 and 11 and is capable of assuming three different end positions. Two of these are active positions and are indicated as 4 and 4' in FIG. 1. In the full-line position 4, the semi-reflector intersects the parallel beam from lens unit 3 at an angle of 45° to the beam axis in one direction, so as to transmit part of the beam directly to lens unit 8 which will therefore form an image on element 7, and to reflect the remaining part of the beam towards lens unit 6 which will form an image on receiver element 5. In the other active position, shown in broken lines as 4', the reflector member intersects the original beam at a 45° angle in the opposite direction, so as again to transmit part of said beam directly to lens unit 8 and again form an image on element 7, while reflecting the remaining part of the beam towards lens unit 11 and thus form an image on receiver element 10. In the third position, indicated as 4'', the semi-reflector member 4 is retracted away from the common plane containing the optical axes of the four lens units 3, 6, 8 and 11, so as to allow the beam from lens unit 3 to pass entirely to the lens unit 8.

It will thus be seen that in the first active position 4, the system provides two images of the brightness amplifier screen 1 on both receiver elements 7 and 5, thus making possible, for example, simultaneous remote viewing on a television screen and recording on a moving-picture film. In the second active position 4, the system provides two images on both elements 7 and 10, providing the simultaneous television viewing and photographic recording; while in the third, retracted, position 4'' of the reflector member, the image is viewable on television alone, with the full available brightness.

In accordance with an essential feature of the present invention, the means for displacing the semi-reflector 4 between its three positions are so arranged that the 90° rotational displacements of said member between its two reversely-inclined positions at 45° to the main beam axis, are effected while the member 4 is positioned outside of the common plane of the axes defined above, i.e., which said member is positioned in the retracted position generally designated 4''. In other words, said displacing means are so arranged that in order to move the semi-reflector from position 4 to position 4' or vice versa, said member is first retracted in the general direction indicated by the double-arrow in FIG. 2, then rotated 90°, and then advanced back to its desired active position.

It will be apparent that with the arrangement described, the axial distance between the lens units 3 and 8, and the axial distance between lens units 6 and 11, can be held to the strict minimum required to receive the semi-reflector 4 therein in the 45°-angled position of said member. In this manner vignetting effect in the transmission of light from lens unit 3 to each of the lens units 6, 8 and 11, is reduced to a minimum and the optical quality of the resulting images is enhanced.

Figure 3:
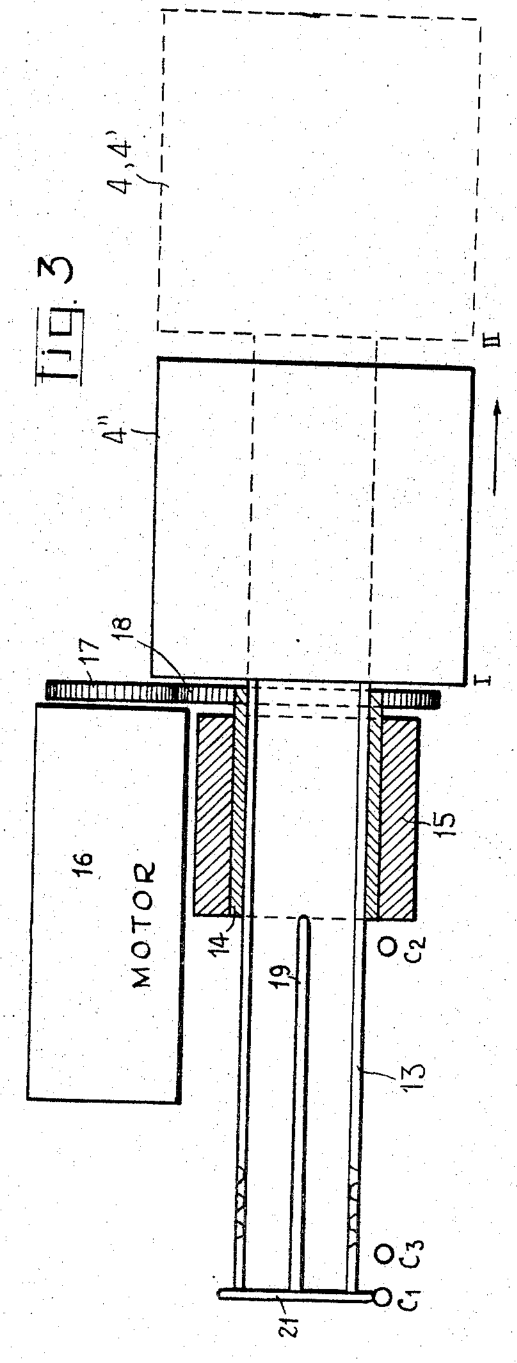
FIG. 3 is a larger-scale view, partly in axial section, of the mechanism used in selectively positioning the semi-reflector member used in the apparatus of FIGS. 1 and 2.
Figure 4:
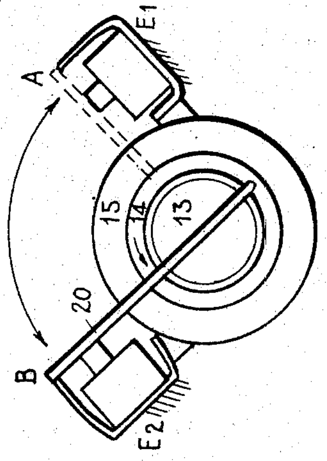
FIG. 4 is an end view as seen from the left of FIG. 3, additionally showing certain parts omitted from FIG. 3 for clarity.

While various different mechanisms may be used for imparting to the single semi-reflector 4 used in the invention the type of displacement defined above, a preferred form of mechanism which has proved especially advantageous in view of its simplicity, accuracy and generally good performance is illustrated in FIGS. 3 and 4.

The semi-reflector mirror, here again designated 4'' in its retracted position (here shown in full lines) and designated 4 and 4' in its active positions (here shown in broken lines), is mounted through suitable means at the end of a screw shaft 13, so as to have its reflecting plane substantially coincident with a diametric plane of the screw. The screw shaft 13 engages in a complementary nut member 14 in the form of an internally threaded sleeve, rotatably but not slidably mounted in a support 15 secured to stationary structure of the apparatus. A reversible electric motor 16 also supported on said stationary structure rotates a drive gear 17 which meshes with a gear 18 secured coaxially on an end of the nut 14.

The screw shaft 13 is formed with a diametrically extending slot 19 over part of its axial extent, and a flat vane 20 is slidably received in the slot and is connected to the stationary structure through means, not shown, whereby the vane is rotatable bodily with the screw shaft 13 but is restrained from axial displacement therewith relative to the stationary structure. Rotation of vane 20 and hence that of screw shaft 13 is limited to an arc of 90° as indicated by the two-headed arrow in FIG. 4, by a pair of limiting stops which constitute the cores of respective electromagnets E1 and E2 supported from the stationary structure. The vane 20 is made of magnetic material.

The arrangement described operates as follows. It is first assumed that the mirror 4 is in its active position 4 (FIG. 1) in which it divides the original beam and directs one beam component to receiver element 7 (TV-camera) and the other beam component to 5 (cine-camera). The relative setting of the mirror 4 on shaft 13 relative to slot 19 is such that in this position of the mirror vane 20 is abutting the core of magnet E2 (position B, FIG. 4). The winding of electromagnet E2 is at this time energized as will presently appear. Assuming it is desired to shift the mirror 4 to its reversely inclined position 4' for directing the beam both to the TV receiver element 7 and the photo-camera film element 10, then the motor 16 is started in rotation in one direction, say counterclockwise as viewed from the left end of FIG. 3 or in FIG. 4. This produces, through gears 17, 18, clockwise rotation of nut 14. Since electromagnet E2 is energized, vane 20 is retained in its position (B) by a magnetic attractive force which predominates over the frictional force between the cooperating threads of nut 14 and screw 13, so that the screw shaft is prevented from rotating. The screw shaft is thus constrained to move axially leftward as indicated by the lower arrow in FIG. 3, without being able to rotate. The mirror carried by the screw shaft is displaced bodily leftward towards its retracted axial position while retaining its initially-assumed angular position.

The screw shaft 13 carries an angular switch-actuating member 21 at its free end, and as the screw shaft nears its endmost leftward position shown in full lines in FIG. 3, ring 21 actuates a micro-switch C3 supported from fixed structure not shown and connected in the energizing circuit for the electromagnets. Actuation of switch C3 deenergizes electromagnet E2 and energizes electromagnet E1. Deenergization of magnet E2 releases the vane 20 and now causes the screw shaft 13 to be rotated clockwise bodily with nut 14 due to the friction force between the complementary screw threads, so that vane 20 is rotated to its reversely inclined position (A, FIG. 4) in abutment with the core of magnet E1, while the axial displacement of the screw shaft 13 is momentarily arrested. As vane 20 engages the core of magnet E1, rotation of the screw shaft 13 is once again arrested and its axial leftward displacement is in turn resumed. After a short additional amount of leftward displacement, actuator ring 21 engages a limit switch C1 mounted beyond switch C3 and connected in the energizing circuit for motor 16. Actuation of switch C1 by ring 21 breaks the motor energizing circuit and the motor stops. The mirror is now positioned in its retracted position 4'' and is inclined in a setting reverse from its initially assumed setting.

To advance the mirror from its retracted position to its desired active position 4', the motor is now energized to rotate in the reverse (clockwise) direction, by acting on switch C1 or on another switch, not shown. Nut 14 is now rotated counterclockwise, and since the screw 13 is prevented from revolving owing to the magnetic attraction of vane 20 to the core of magnet E1, energized at this time, the screw shaft 13 is advanced axially rightward and carries the mirror with it. As the screw shaft reaches a fully advanced position the actuator ring 21 actuates an opposite limit switch C2, deenergizing motor 16. The mirror has thus been moved to its reverse active position 4' in which it divides the original beam from lens unit 3 between the TV-camera receiver element 7 and the photo-camera receiver element 10. The reverse displacement of the mirror from position 4' to position 4 would of course be effected through a sequence of actions similar to but reverse from the sequence described.

When it is desired to retain the mirror in its retracted position 4'' for receiving the full flex of the beam on the element 7 for television viewing exclusively, then the sequence of movements above described in detail would simply have to be interrupted after the first stage, i.e., after ring 21 has actuated limit switch C1 to deenergize the motor 16 with the movable assembly in retracted position.

It will thus be seen that the embodiment described achieves the objects of the invention in that the position of the final image can be selectively switched between receiver element 7 alone, both receiver elements 7 and 5 or both receiver elements 7 and 10, with the use of a single semi-reflector member by imparting to said member a sequence of displacement steps such that the movement of the member in its reversely inclined position does not interfere with an advantageously close axial spacing between the various objective lenses of the system, thereby maintaining optimal optical quality in the final images.

Various changes may be made in the embodiment of the invention disclosed without exceeding the scope of the invention. Thus the receiver units associated with the respective elements 5, 7 and 10 may assume other forms than those mentioned. One of said elements, say element 7, may be a simple viewing screen for direct visual observation of the image. The source of the original image-carrying beam may be other than a brightness amplifier tube. The mechanism used in shifting the semi-reflector member may be modified, as for example by substituting mechanical latching means for the electro-magnets E1 and E2 which serve to restrain the rotation of the screw shaft. The electric control circuitry associated with the motor, electromagnets, and switches described has not been disclosed in detail since it will be readily designed by those familiar with the art so as to perform the control functions here disclosed.

I claim:

1. Optical apparatus comprising means providing a parallel beam, a first image-receiving element positioned in alignment with the beam axis; a second and a third image-receiving element positioned on opposite sides of the beam and both in alignment with another axis normal to and intersecting said beam axis; and means for selectively directing said beam on to any one of said elements comprising a reflector member, means for supporting said member in either one of two active positions wherein the reflecting plane of the member substantially intersects the intersection of said axes with said member being inclined at 45° to each of said axes in one direction in said first active position and in a reverse direction in said position, means for supporting said member in a retracted position spaced from the plane defined by both said axis, and means for shifting said member in translation between either of its said active positions and its retracted position, and for rotating said member between its said reversely inclined positions while retracted.

2. Apparatus according to claim 1, wherein said reflector member is semi-transparent for simultaneously directing said beam on to said first element and a selected one of said second and third elements in each of its said active positions.

3. The apparatus defined in claim 1, wherein the means for providing said beam includes the image screen of a brightness amplifier tube.

4. The apparatus defined in claim 1, wherein said image-receiving elements include input elements of a television camera, a photo-camera and a cine-camera.

5. Optical apparatus comprising means providing a parallel image-carrying beam; a first image-receiver element positioned in alignment with the beam axis; a second and a third image-receiving element positioned on opposite sides of the beam and both in alignment with another axis normal to and intersecting said beam axis; a first, a second and a third objective lens unit respectively positioned ahead of said elements for focussing an image thereon; a semi-reflector member; means for supporting said member in either one of two active positions wherein the reflecting plane of the member substantially intersects the intersection of said axes, with said member being inclined at 45° to said axes in one direction in a first one of said active positions so as partly to pass the beam to said first lens unit and partly reflect the beam to said second lens unit for simultaneously forming images on both said first and second elements, and being inclined at 45° to said axes in a reverse direction in a second one of said active positions for simultaneously forming images on both said first and third elements; means for supporting said member in a retracted position spaced from the plane defined by both said axes for forming an image exclusively on said first element; means for displacing said member in translation between either of its active positions and a position at least approaching its retracted position without rotating the member; and means for displacing said member in rotation between its said reversely inclined positions while retracted, whereby the spacing between said lens units can be held substantially to the minimum required to receive said member therebetween in either of its reversely inclined active positions.

6. Optical apparatus comprising:

means providing a parallel beam;

a reflector member interposable in the path of said beam in either one of two reversely-inclined active positions and retractable away from the beam to a retracted position, and mechanism for displacing said member between its positions without rotating the member while interposed in the path of the beam, said mechanism comprising a pair of threadedly cooperating screw and nut elements;

means supporting the member from one of said elements;

means supporting the other element from stationary structure of the apparatus for rotation but not for axial displacement relative thereto;

opposed stop means for limiting the rotation of said one element to an angular range between angular end positions in each of which said member assumes a related one of its said reversely inclined positions;

means for releasably latching said one element in each of its said angular end positions against rotation but not against axial translation;

means for selectively rotating said other element in either of two opposite directions while said one element is latched in a related one of its angular end positions whereby to displace said one element in axial translation and move said member between its retracted and a related one of its active positions, and further means for releasing said latching means in the retracted axial position of said member whereby to rotate said one element and member between said reversely inclined angular positions.

7. The apparatus defined in claim 6, wherein said stop means and said releasable latching means comprises a pair of selectively energizable electromagnet cores, and said one element has a vane-like part projecting radially therefrom and includes magnetic material for electromagnetic latching cooperation with either of said electromagnet cores when energized.

8. The apparatus defined in claim 7, including switch means actuated by said one element during axial displacement thereof for controlling the energization of said electromagnets.

9. The apparatus defined in claim 5, wherein said one element is a screw shaft having a diametric slot formed therein over part of its axial extent, and said vane-like part is slidably received in said slot.

10. The apparatus defined in claim 6, wherein the means for rotating said other element comprises an electric motor, means for energizing the motor to rotate said other element in a selected direction, and limit switch means actuated by said one element at the limits of its axial displacement for deenergizing the motor.

11. The apparatus defined in claim 6, wherein said one element is a screw shaft and said other element is internally threaded.

References Cited

UNITED STATES PATENTS

| | | | |
|---|---|---|---|
| 2,525,445 | 10/1950 | Canada | 88—14 |
| 3,104,283 | 9/1963 | Moller | 178—7.85 X |

JOHN W. CALDWELL, *Acting Primary Examiner.*

R. L. RICHARDSON, *Assistant Examiner.*